United States Patent
Atherton et al.

(10) Patent No.: US 7,284,084 B2
(45) Date of Patent: Oct. 16, 2007

(54) ROM SCAN MEMORY EXPANDER

(75) Inventors: William Edward Atherton, Hillsborough, NC (US); Daryl Carvis Cromer, Apex, NC (US); Richard Alan Dayan, Raleigh, NC (US); Scott Neil Dunham, Raleigh, NC (US); Eric Richard Kern, Durham, NC (US); Howard Jeffrey Locker, Cary, NC (US); William Bradley Schwartz, Apex, NC (US); Adam Lee Soderlund, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/929,323

(22) Filed: Aug. 30, 2004

(65) Prior Publication Data

US 2006/0047858 A1   Mar. 2, 2006

(51) Int. Cl.
G06F 12/00 (2006.01)
G06F 13/00 (2006.01)
G06F 13/28 (2006.01)
(52) U.S. Cl. .................... 711/102; 711/170; 713/2
(58) Field of Classification Search .................. 713/2; 711/102, 170
See application file for complete search history.

(56) References Cited

U.S. PATENT DOCUMENTS

2005/0182913 A1* 8/2005 Zimmer .................. 711/207

OTHER PUBLICATIONS

Introduction to PCI-Express: the AGP8X Replacement, PCstats.com Newsletter, 2004.

* cited by examiner

Primary Examiner—Matthew Kim
Assistant Examiner—Edward J Dudek
(74) Attorney, Agent, or Firm—Cynthis S. Byrd; Dillon & Yudell LLP

(57) ABSTRACT

A method and system for booting up multiple PCI peripheral devices, such that the number of bootable PCI peripheral devices is not limited by the amount of computer system memory that is dedicated to storing executable boot code for the peripheral devices. The executable boot code is stored on a Read Only Memory (ROM) on each peripheral device. When a new PCI peripheral device begins to boot up, a check for available memory space in a ROM scan memory address space is performed. If there is not enough available room in the ROM scan memory address space for the new device's executable boot code, then a ROM scan detection logic pages an image of another peripheral device's executable boot code out of the ROM scan memory address space before storing the new device's executable boot code into the ROM scan memory address space.

18 Claims, 6 Drawing Sheets

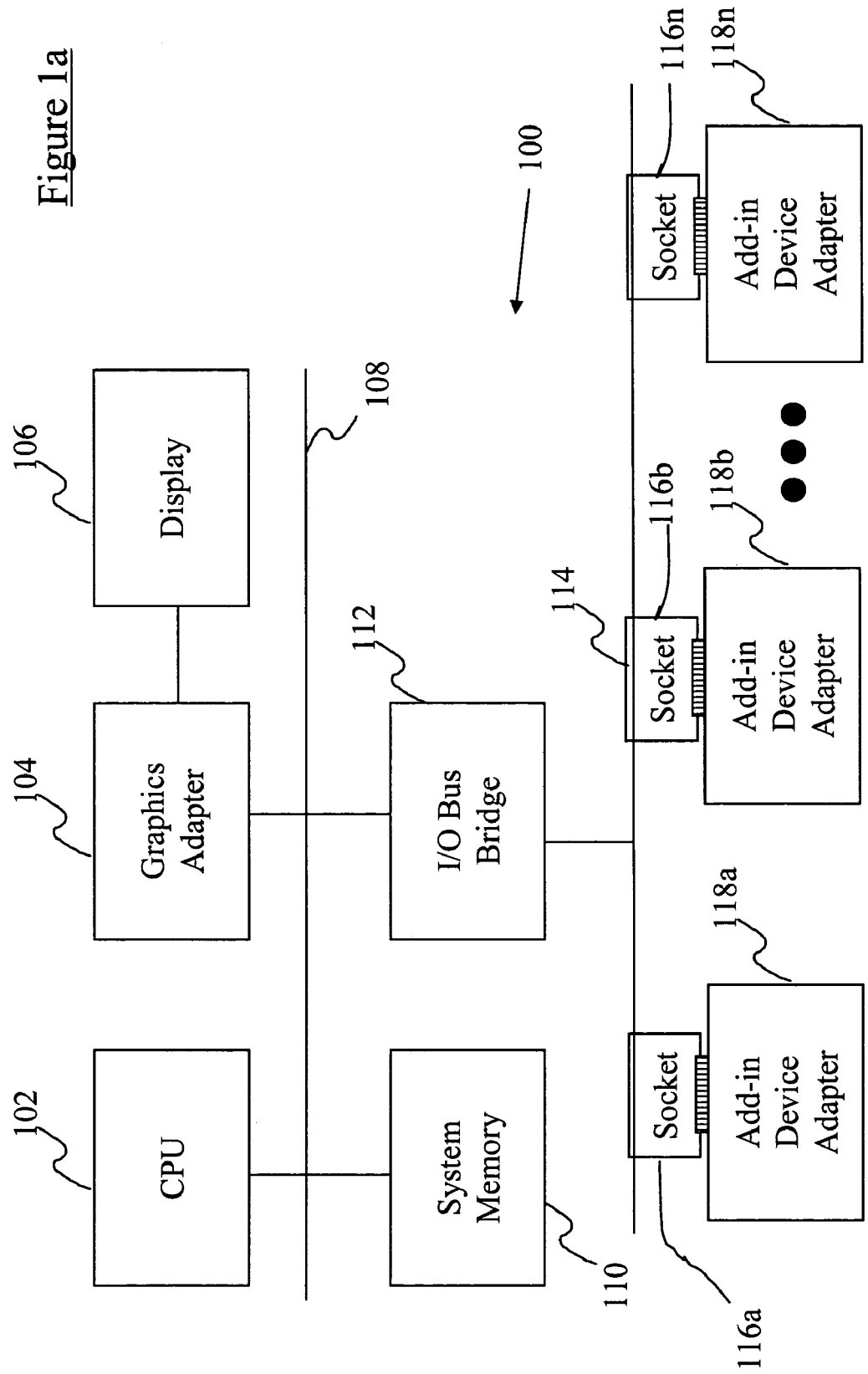

Figure 5

1. ROM Paging Handler #2 invoked, determines that next interrupt code to call is already in C000:D000 segment
2. ROM 5 is run; calls next hooked interrupt
3. ROM Paging Handler #1 is invoked; determines next interrupt to call is paged out, saves ROM 5, pages in ROMS 1,2,3,4; calls into ROM 4
4. ROM 4 is run, calls into ROM 3
5. ROM 3 is run, calls into ROM 2
6. ROM 2 is run, calls into ROM 1
7. ROM 1 runs, exits back to ROM 2
8. ROM 2 exits out to ROM 3
9. ROM 3 exits out to ROM 4
10. ROM 4 exits out to ROM Paging Handler #1
11. ROM Paging Handler #1 puts ROM 1,2,3,4 back into reserved memory space and restores ROM 5
12. ROM 5 exits out to ROM Paging Handler #2
13. ROM Paging Handler #2 issues IRET to resume normal system operation

ROM SCAN MEMORY EXPANDER

BACKGROUND OF THE INVENTION

1. Technical Field

The present invention relates in general to the field of computers, and in particular to add-in peripheral devices. Still more particularly, the present invention relates to a method and system for initializing an add-in peripheral device without being limited to available memory in a dedicated boot memory address space.

2. Description of the Related Art

To expand the capability of a computer, peripheral devices may be added on. One method known to add on such a peripheral device is to plug the peripheral device into a physical socket on a motherboard in the computer. Once the peripheral device is plugged in, the computer learns about the existence of a Read Only Memory (ROM) that is on the peripheral device. This ROM is known as an "option ROM." The information stored on the option ROM includes code which can initialize the peripheral device during a Power On Self Test/Basic Input Output System (POST/BIOS) initialization performed by the computer during power on or a soft start.

On many modern computer systems, particularly computer server systems, and still more particularly servers such as the xSeries™ of servers manufactured by International Business Machines (IBM), the physical sockets are on a bus that is compliant with the Peripheral Component Interconnect (PCI) specification (including the standards for PCI, PCI-X, and PCI Express). The bus is thus known as a "PCI bus." The option ROM described above on the peripheral device that connects to the PCI bus is called a PCI ROM.

The PCI specification and xSeries™ chipset technology require that, during a POST/BIOS initialization, information in the PCI ROM from the peripheral device must be loaded into and executed from a portion of the computer's system memory address space that is set aside for add-in programs stored in the PCI ROM. This address space is traditionally between $C0000_{hex}$ (C0000h) and $DFFFF_{hex}$ (DFFFFh), and is accessible only for booting peripheral devices. The total memory space between C0000h and DFFFFh is $131,072_{dec}$ bytes (128 KB).

In early computer systems, 128 KB of memory was usually sufficient to load and execute all of the PCI ROMs from all of the peripheral devices. However, modern computers, and particularly servers such as the xSeries™ manufactured by IBM, provide 4 to 6 expansion slots on a PCI bus. All of the expansion slots may be fully populated with adapter cards for multiple purposes, such as Management Processsors, Network Cards, or Input/Output (I/O) cards, including cards for devices such as a Redundant Array of Inexpensive Drives (RAID) mass storage device. Each of these adapter cards can contain up to 64 KB of BIOS or embedded code that must run in the memory address space between C0000h and DFFFFh.

It is thus apparent that, for a fully populated PCI bus, the address space allocated between C0000h and DFFFFh for add-in peripheral device PCI ROMs is not sufficient. Therefore, some of the PCI devices must either be disabled, or even physically unplugged from the PCI bus, in order to avoid an "1801 PCI Error," which indicates that all of the space between C0000h and DFFFFh has been taken up by other PCI ROMs. If additional PCI devices attempt to boot with the C0000h and DFFFFh space full, the boot sequence for those PCI devices will likely not execute, and those new devices will not function.

What is needed, therefore, is a method and system that allows all add-in PCI devices to be configured in a computer in order to provide a full range of boot devices and booting options in a computer, without being limited by the space available in the C0000h and DFFFFh address space in the computer's system memory. Preferably, such a method and system would not require an end user to modify the computer's hardware configuration, such as physically removing PCI devices according to their memory requirements and the limited address space available for add-in devices in the computer's system memory.

SUMMARY OF THE INVENTION

The present invention is thus directed to a method and system for configuring and enabling multiple PCI peripheral devices to participate in booting, such that the number of bootable PCI peripheral devices is not limited by the amount of computer system memory that is dedicated to storing executable boot code for the peripheral devices. The executable boot code is stored on a Read Only Memory (ROM) on each peripheral device. The computer system memory that is dedicated to storing the executable boot code is called the ROM scan memory address space. When a new PCI peripheral device begins to boot up, a check for available memory space in the ROM scan memory address space is performed. If there is not enough available room in the ROM scan memory address space for the new device's executable boot code, then a ROM scan detection logic pages an image of another peripheral device's executable boot code out of the ROM scan memory address space before storing the new device's executable boot code into the ROM scan memory address space. Coordination of the paging operation is facilitated by a System Management Interrupt (SMI) paging detector logic.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1a depicts an exemplary computer system in which the present invention may be implemented;

FIG. 5 is a listing of pseudocode for paging ROM Scan data into and out of the ROM Scan area.

DETAILED DESCRIPTION OF THE PREFERRED EMBODIMENT

Figure 1B:
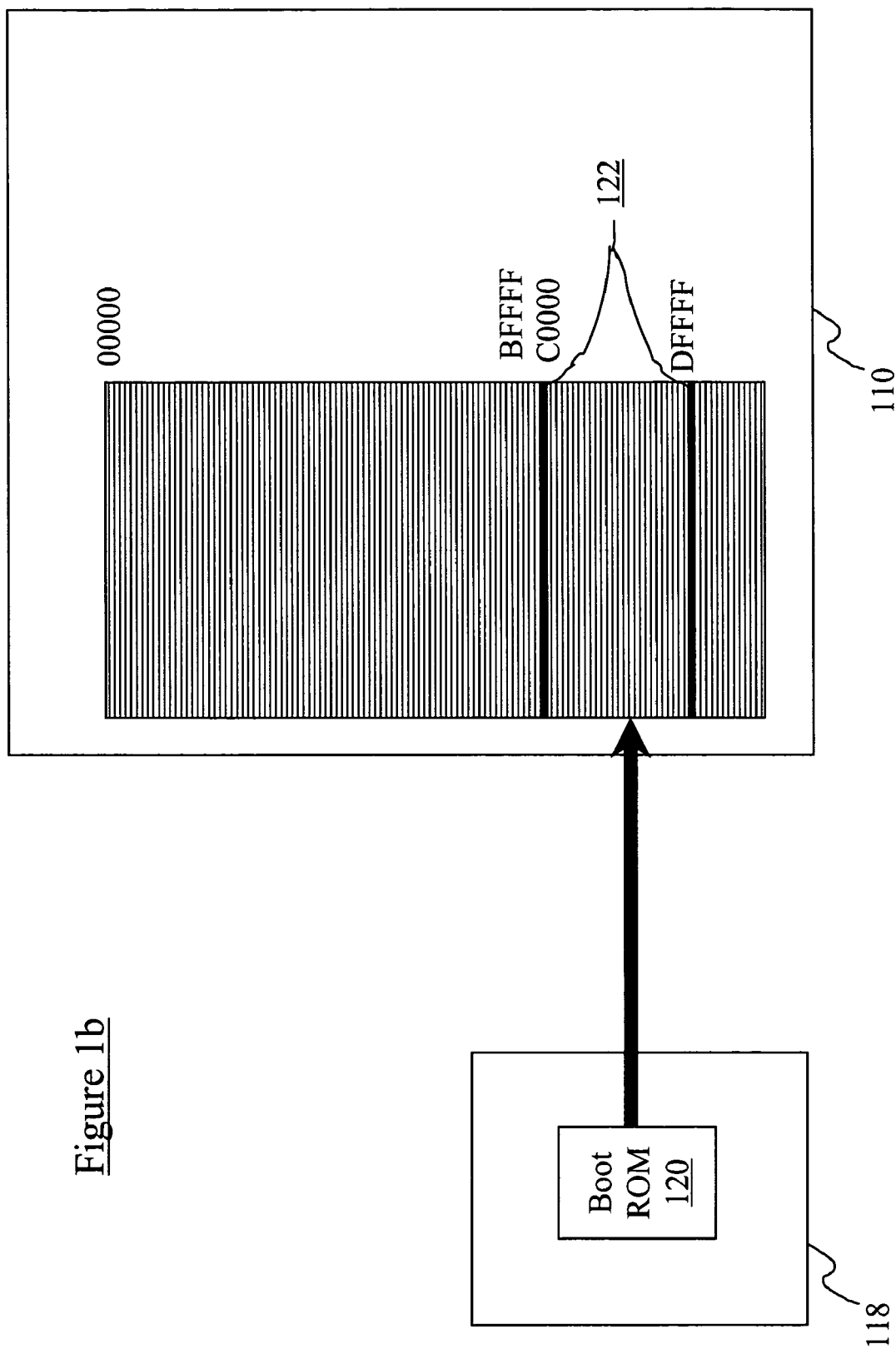
FIG. 1b illustrates a ROM Scan area in a memory in the computer system of FIG. 1a, in which initialization boot ROM code from an add-in device must run (by convention)

With reference now to the figures, and particularly to FIG. 1a, there is depicted a block diagram of an exemplary data processing system in which a preferred embodiment of the present invention may be implemented. Data processing system 100 may be, for example, one of the models of personal or server computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. In a preferred embodiment of the present invention, I/O bus 114 is compliant with the Peripheral Component Interconnect (PCI) specification (including the standards for PCI, PCI-X, and PCI Express), and thus is referenced as a "PCI bus."

Connected to I/O bus 114 are sockets 116, which are channel connectors into which add-in device adapters 118 are plugged. Add-in device adapters 118 are cards that provide an interface logic for peripheral devices such as nonvolatile storage, input devices, network adapters, etc.

The exemplary embodiment shown in FIG. 1a is provided solely for the purposes of explaining the invention and those skilled in the art will recognize that numerous variations are possible, both in form and function.

With reference now to FIG. 1b, additional detail is shown for add-in device adapter 118, which includes a boot ROM 120, and system memory 110, which includes a ROM scan memory address space identified as a ROM Scan area 122, which is reserved between addresses C0000h and DFFFFh. Boot ROM 120 may contain 64 Kilobytes (KB) or more of boot code for the add-in device adapter 118.

Before performing the steps described below in FIG. 2, in which a preferred embodiment of steps taken by the present invention is presented, additional improvements to computer 100 are preferably made to the system's setup, Power On Self Test (POST), and System Management Interrupt (SMI) Handler to create a computer that is aware of an over-commitment of the ROM Scan area. These changes are now discussed.

Setup Enhancements. In order for computer 100 to support the present invention, termed Rom Scan Memory OverCommit Enhancement, computer 100's setup should be enhanced to recognize an over commitment of the ROM Scan memory address space (ROM scan area 122). A new Over Commit ROM Scan header within boot ROM 120 is also made available to quickly identify those add-in ROMs supporting the present invention. Furthermore, setup is enhanced to make allocations for add-in boot. ROMs 120 in the memory address at the upper portion of system memory 110, above 1 MB.

The ROM Scan process, executed by CPU 102, executes in a traditional manner (loading and executing add-in boot ROMs 120 to boot and initialize add-in device adapters 118) until the ROM Scan area 122 is recognized as being full. At this point, Setup sets an overcommit flag to indicate to POST that an OverCommit module of the SMI Handler needs to be loaded into System Management Memory (SMM) and linked into the SMI Handler. The overcommit flag is also used to signal to the ROM Scan process to determine which interrupt vectors each add-in ROM uses, and to build a table for the SMI Handler to be able to recognize which add-in ROM program module is to be loaded into the actual ROM Scan Memory address space during boot time.

Typically, add-in ROMs provide boot functionality or setup functionality during the pre-OS boot environment. OS runtime support is provided by a software loaded device driver called by the OS. Thus, the add-in boot ROM is no longer needed until the next power-up or soft reboot (alt-ctrl-del). For these reasons, in a preferred embodiment of the present invention, the over-commit enhancement will only be provided for add-in ROMs used in the preboot environment, prior to booting the OS.

When Setup starts and recognizes an overcommit condition, Setup determines the next available address for allocation in the upper portion of the memory address space. Setup allocates up to 256 KB for each add-in ROM. However, the ROM scan routines should only count on 96 KB being available for paging, since the first 32 KB of the ROM Scan memory address space is statically allocated to, inter alia, Video BIOS.

The add-in ROM can save a larger image, but will be responsible for paging in any code when required into the ROM Scan area. The size of the individual allocation requests can be obtained whether from the adapter itself or from an associated file. The allocation size also depends on any persistent or static allocations to add-in ROMs that cannot be paged.

POST Modifications. During ROM Scan (i.e., the process of booting ROMs 120 into ROM scan area 122), all valid ROM Scan Headers are found and initialized. In the present invention, static add-in ROMs are initially found and allocations are initialized. ROM Scan remembers the starting address of the unallocated area in the ROM Scan area and passes this on to the SMI Handler. At this point, ROM Scan saves the contents of the real mode interrupt vector table. One over committed add-in boot ROM at a time, POST pages a ROM image in the upper portion of memory dedicated to the over committed ROM images, into the ROM Scan paging area. POST then checks for a valid header at the beginning of the paging area. If a valid header is found, POST turns control over to the initialization routine in Setup. Once the routine is finished processing, it returns to POST as established by the original ROM Scan process. POST then compares the contents of the interrupt vectors to the state prior to calling the add-in boot ROM initialization program. Any changes in the interrupt vectors are saved in the SMI handler. This information is used to identify the boot device and its associated ROM image when booting actually commences. The current contents of the interrupt vectors are saved as the "original" values, and the next image found in the ROM Scan images in high memory is processed. This process is repeated until all ROM images are checked for a header and initialized. The contents of all interrupt vectors and image identifiers modified during the ROM Scan process are passed to the SMI handler in a table as described above.

POST is also enhanced to recognize a new ROM Scan header. When a new ROM Scan header is detected, POST automatically creates an entry in the ROM Scan Paging area in high memory for the new ROM image.

SMI Handler Enhancement. During the boot process, which is during the time that a boot handler boots the OS, the SMI handler has been modified to identify one of the modified interrupt vectors being accessed. Associating the interrupt vector accessed to the image which modified the value of the interrupt vector during ROM Scan time, the SMI handler pages the identified image into the ROM Scan area, if the image is not already present in the ROM Scan area.

Figure 2:
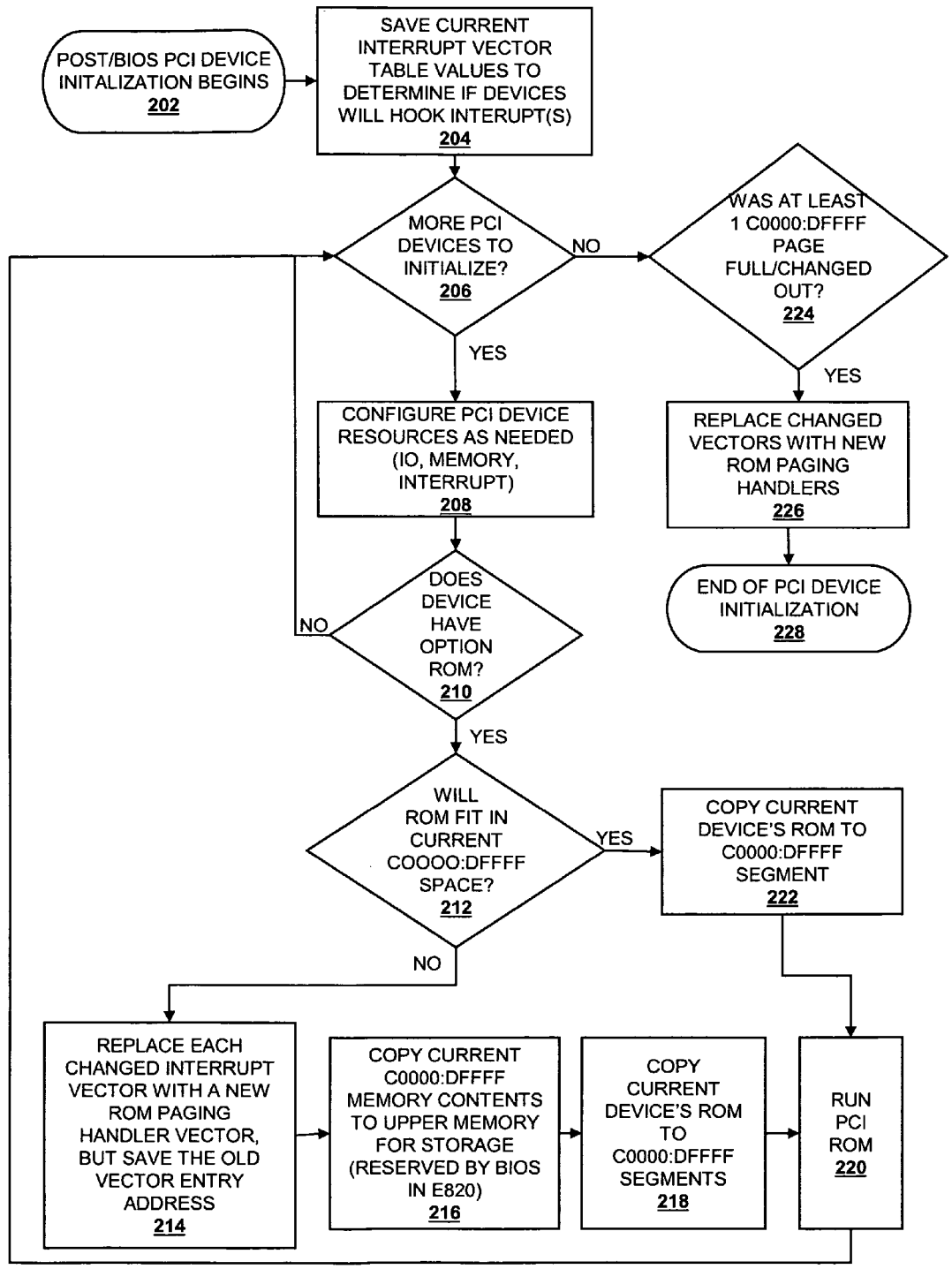
FIG. 2 is a flow-chart of steps taken in accordance with the present invention to initialize add-in devices.

With reference now to FIG. 2, a flow-chart of preferred steps taken to initialize add-in devices is presented. Starting at initiator block 202, POST/BIOS PCI device initialization begins, in which an add-in device adapter is first recognized by a computer system. Current interrupt vector table values are then saved, in order to determine if the new add-in device will hook interrupts (block 204). That is, in the preferred embodiment of the present invention, newly added devices are evaluated to determine if the ROM on the add-in device contains code for hooking a system management interrupt (SMI).

A query is made (query block 206) to determine if other add-in devices (preferably a device that is compliant with the PCI standard, and thus is known as a "PCI device") need to be initialized. If so, then the resources needed for that PCI device are configured (block 208). Such resources may include memory allocations, Input/Output (I/O) configuration/authorization, interrupt handler routines, etc.

A query is then made as to whether the PCI device to be added into the system has a ROM (called an "option ROM") that contains initialization code for the PCI device (query block 210). If so, then a query is made as to whether the code in the option ROM will fit in the C0000h:DFFFFh address space, in which the initialization code for any and all add-in devices with option ROMs must run if they are providing boot services. If there is not enough room in the C0000h:DFFFFh address space, then each changed interrupt vector is replaced with a new ROM paging handler vector, and the old vector entry address is saved (block 214). A copy of the current C0000h:DFFFFh memory contents is then copied to upper memory (somewhere above 1 MB but below 4 GB) for storage (block 216), and the contents of the current PCI device's option ROM is copied into the C0000h:DFFFFh address space (block 218). The new PCI device's option ROM is then run (block 220), initializing the new PCI device. Similarly, if there was room earlier in the C0000h:DFFFFh address space (query block 212), then the contents of the new PCI device's option ROM is simply copied into the C0000h:DFFFFh address space for execution (block 222).

Returning to query block 206, if there are no additional PCI device's to initialize, then a query is made (query block 224) as to whether the contents of C0000h:DFFFFh had ever been paged out, as described in block 214-218. If so, then any interrupt vectors that were changed are replaced with new ROM paging handlers (block 226), and the PCI device initialization process ends (terminator block 228).

Figure 3:
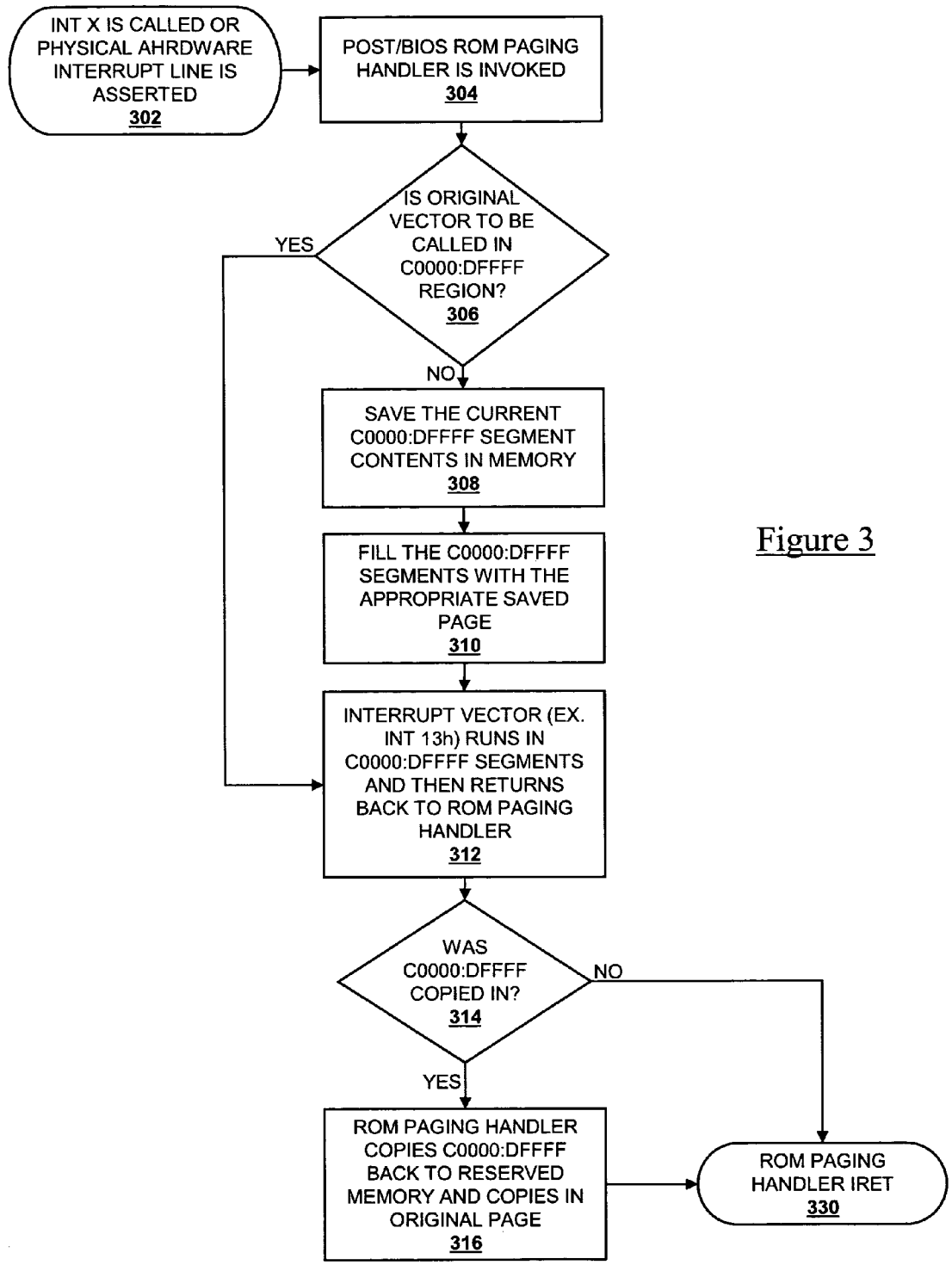
FIG. 3 is a flow-chart of steps taken in accordance with the present invention to page boot ROM code into and out of the ROM Scan area.

With reference now to FIG. 3, a flow-chart is shown describing steps in a preferred method of using interrupt vectors to page ROM data in and out of the C0000h:DFFFFh address space. Starting at initiator block 302, an interrupt software routine is called, or a physical hardware interrupt line is asserted. A POST/BIOS paging handler is invoked (block 304), if so authorized as described in FIG. 2 in block 204. A query (query block 306) is made as to whether the initialization code from the option ROM is in the C0000h:DFFFFh region. If not, then the current contents of the C0000h:DFFFFh region are paged out (saved to) upper memory (block 308), and the C0000h:DFFFFh region is populated with the option ROM data with the interrupting event that triggered the presence check that is stored in upper memory (block 310). The interrupt handler then runs in the C0000h:DFFFFh address space, and then returns back to a ROM paging handler (block 312).

A query is made as to whether a page of option ROM data was paged into (copied in) the C0000h:DFFFFh region (query block 314). If so, then the ROM paging handler copies the contents of the C0000h:DFFFFh region back into reserved upper memory, and the original contents of the C0000h:DFFFFh region is moved back into the C0000h:DFFFFh address space (block 316). The ROM paging handler then issues an Interrupt Return (IRET) command, ending the operation. Referring back to block 306, if the interrupt handler is already present in the C0000h:DFFFFh address space, then the handler is executed (block 330).

Figure 4:
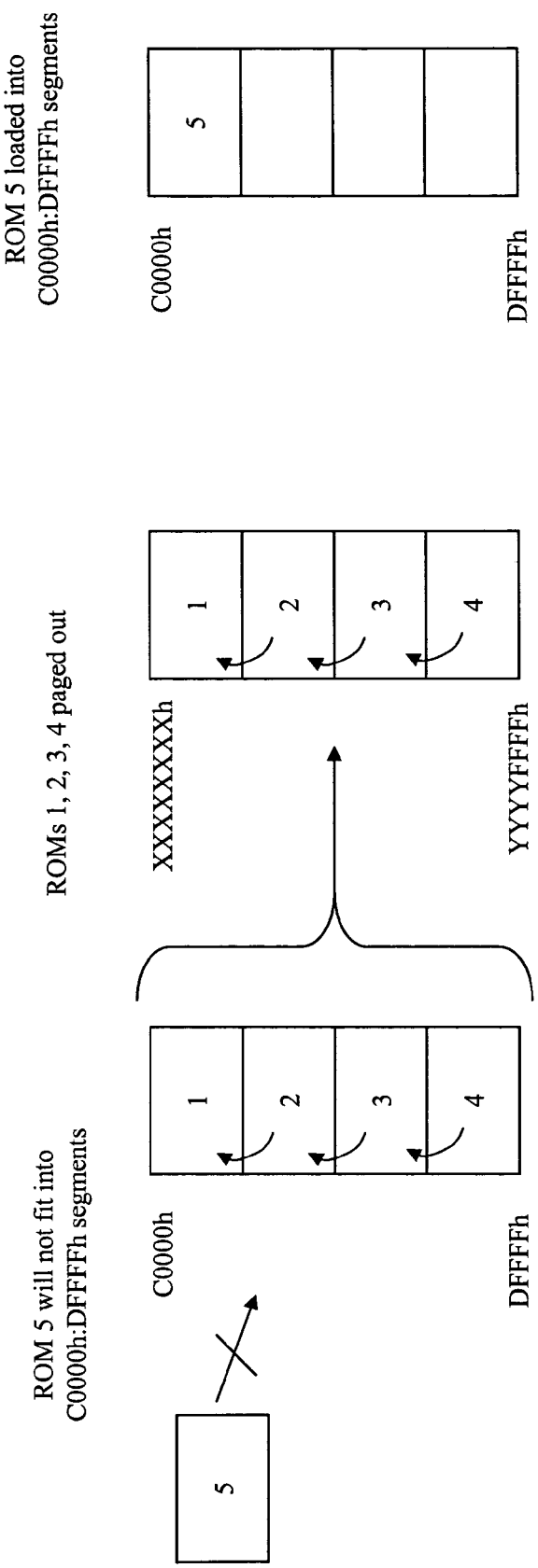
FIG. 4 depicts ROM Scan data being paged into and out of the ROM Scan area.

With reference now to FIG. 4, an overview of the present invention is shown. As seen in FIG. 4, an initial condition, which the present invention addresses and cures, is that the code in option ROM 5 cannot be loaded into the C0000h:DFFFFh address space, which are already fully populated with code from option ROMs 1-4, which happen to be chained (call one another). The code from option ROM 4 has been configured to hook (call) an interrupt that permits paging out data from the C0000h:DFFFFh address space into upper memory (somewhere above 1 MB but below 4 GB) into a memory address identified for exemplary purposes as XXXXXXXXh and YYYYFFFFh. Since the C0000h:DFFFFh address space is now unoccupied, the data from option ROM 5 is now free to be paged into the C0000h:DFFFFh area. Referring back to block 314, if the interrupt handler was not copied into the C0000h:DFFFFh address space, the IRET command is executed.

With reference now to FIG. 5, pseudocode is shown for the steps taken to run the code from option ROM 5 and then to run previously paged out code from option ROMs 1-4. The pseudocode presumes that an interrupt has been invoked, such as Int 13*h* for a diskette.

Starting with Line 1 of the pseudocode in FIG. 5, a ROM Paging Handler (identified as ROM Paging Handler #2) is invoked, and a determination is made that the next interrupt code to call is already in the C0000h:DFFFFh address space. That is, the code from option ROM 5 is already in the C0000h:DFFFFh address space where it can run, but a determination is made to ensure that other option ROM code can be paged back into the C0000h:DFFFFh address space using interrupt code, such as a System Management Interrupt (SMI) call.

At Line 2, the code from option ROM 5 is run, and then a call is made to the hooked next hooked interrupt. That is, after running ROM 5, the ROM Paging Handler #2, which has hooked interrupts that it can call, calls the next hooked interrupt.

At Line 3, the ROM Paging Handler #1, which is a Second Level Interrupt Handler (FLIH) to the First Level Interrupt Handler (FLIH) ROM Paging Handler #2, is invoked. The ROM Paging Handler #1 determines which next interrupt to call is to be paged out of the C0000h:DFFFFh address space, saves the data from option ROM 5 (into upper memory), and the pages the data from option ROMs 1,2,3,4 into the C0000h:DFFFFh address space. As in FIG. 4, ROMs 1,2,3,4 and chained, and so the last ROM 4 is called first.

At Line 4, ROM 4 is run, and then ROM 4 calls (hooks) into ROM 3.

At Line 5, ROM 3 is run, and then ROM 2 is called for execution.

At Line 6, ROM 2 is run, and then ROM 1 is called for execution.

At Line 7, ROM 1 runs, and then exits (reverse hook) back to ROM 2.

At Line 8, ROM 2 exits back to ROM 3.

At Line 9, ROM 3 exits out to ROM 4.

At Line 10, ROM 4 then exits out to ROM Paging Handler #1, which at Line 11, puts ROMs 1,2,3,4 back into the reserved upper memory space, and restores ROM 5 back into the C0000h:DFFFFh address space.

At Line 12, ROM 5 exits out to ROM Paging Handler #2, which, at Line 13, issues an Interrupt Return (IRET) to resume normal system operation (allowing ROM 5 to continue to execute out of the C0000h:DFFFFh address space.

If another ROM needs to execute, it will page into the C0000h:DFFFFh address space in steps similar to those taken by ROM 5.

While the present invention has referenced the ROM scan memory address space from which the option ROM data can execute as being the addresses between C0000h:DFFFFh, it is understood that any addresses used, by convention or otherwise, for add-in devices as described may be used.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for configuring and enabling multiple peripheral devices to participate in booting, such that a quantity of bootable peripheral devices is not limited by an amount of computer system memory that is dedicated to storing executable boot code for the multiple peripheral devices, the computer-implemented method comprising:
   inserting an Over Commit Read Only Memory (ROM) scan header into a boot ROM in an add-in device adapter, wherein the Over Commit ROM scan header identifies the boot ROM of the add-in device adapter as being capable of supporting a process of paging out, from a ROM scan area, a previously stored boot ROM for an earlier peripheral device with a new boot ROM for a new peripheral device, and wherein each add-in device adapter provides an interface logic for a peripheral device;
   loading and executing add-in boot ROMs for peripheral devices that are coupled to the computer by add-in device adapters until the ROM scan area is recognized by the computer as being full;
   setting an overcommit flag to indicate to a Power On Self Test (POST) that an Over Commit module of a System Memory Interrupt (SMI) handler needs to be loaded into a System Management Memory (SMM) and linked to the SMI handler, wherein the overcommit flag signals a ROM scan process to determine which interrupt vectors each add-in boot ROM uses, and wherein a set overcommit flag enables a building of a table for the SMI handler to be able to recognize which add-in boot ROM is to be loaded into the ROM scan area during boot time;
   in response to the computer detecting an overcommit condition in which the ROM scan area is unable to load add-in boot ROMs for all of the multiple peripheral devices, determining a next available address for allocation in an upper portion of a system memory's address space; and
   paging ROM data in and out of the ROM scan area by:
      calling the Over Commit module of the SMI handler,
      invoking a POST/BIOS (Power-On Self Test/Basic Input-Output System) paging handler to determine if an initialization code from the new boot ROM is stored in the ROM scan area,
      in response to determining that the initialization code from the new boot ROM is not stored in the ROM scan area, paging out all contents of the ROM scan area region to the next available address available for allocation in the upper memory location of system memory, and
      storing the new boot ROM in the ROM scan area.

2. The method of claim 1, further comprising:
during a ROM scan process in which boot ROMs for the peripheral devices are booted into the ROM scan area, finding and initializing all valid ROM scan headers, wherein a valid ROM scan header causes a Power On Self Test (POST) to turn ROM boot control over to an initialization routine for loading the add-in boot ROMs into the ROM scan area, wherein POST then compares contents of interrupt vectors to a state prior to calling the add-in boot ROM initialization program, and wherein any changes in interrupt vectors are saved in the SMI handler to identify a specific boot device and its associated ROM image when booting actually commences.

3. The method of claim 1, further comprising:
initializing add-in device adapters that are coupled to a computer by:
   recognizing all previously installed add-in device adapters that are coupled to a computer,
   saving current interrupt vector table values in order to determine if a new add-in device adapter contains code for hooking a System Memory Interrupt (SMI), and
   in response to determining that the ROM scan area does not have enough room to store the add-in boot ROMs of all of the add-in devices that are coupled to the computer, replacing each changed interrupt vector with a new ROM paging handler vector.

4. The method of claim 1, wherein the peripheral devices are Peripheral Component Interconnect (PCI) devices.

5. The method of claim 1, wherein the address space of the ROM scan area is between the computer's system memory addresses C0000h and DFFFFh.

6. The method of claim 5, wherein the upper memory has an address that is above DFFFFh in the computer's system memory.

7. A system comprising:
a processor;
a data bus coupled to the processor;
a memory coupled to the data bus; and
a computer-usable medium embodying computer program code, the computer program code comprising instructions executable by the processor and configured for:
inserting an Over Commit Read Only Memory (ROM) scan header into a boot ROM in an add-in device adapter, wherein the Over Commit ROM scan header identifies the boot ROM of the add-in device adapter as being capable of supporting a process of paging out, from a ROM scan area, a previously stored boot ROM for an earlier peripheral device with a new boot ROM for a new peripheral device, and wherein each add-in device adapter provides an interface logic for a peripheral device;

loading and executing add-in boot ROMs for peripheral devices that are coupled to the computer by add-in device adapters until the ROM scan area is recognized by the computer as being full;

setting an overcommit flag to indicate to a Power On Self Test (POST) that an Over Commit module of a System Memory Interrupt (SMI) handler needs to be loaded into a System Management Memory (SMM) and linked to the SMI handler, wherein the overcommit flag signals a ROM scan process to determine which interrupt vectors each add-in boot ROM uses, and wherein a set overcommit flag enables a building of a table for the SMI handler to be able to recognize which add-in boot ROM is to be loaded into the ROM scan area during boot time;

in response to the computer detecting an overcommit condition in which the ROM scan area is unable to load add-in boot ROMs for all of the multiple peripheral devices, determining a next available address for allocation in an upper portion of a system memory's address space; and paging ROM data in and out of the ROM scan area by:
calling the Over Commit module of the SMI handler, invoking a POST/BIOS (Power-On Self Test/Basic Input-Output System) paging handler to determine if an initialization code from the new boot ROM is stored in the ROM scan area,
in response to determining that the initialization code from the new boot ROM is not stored in the ROM scan area, paging out all contents of the ROM scan area region to the next available address available for allocation in the upper memory location of system memory, and
storing the new boot ROM in the ROM scan area.

8. The system of claim 7, wherein the instructions are further configured for:
during a ROM scan process in which boot ROMs for the peripheral devices are booted into the ROM scan area, finding and initializing all valid ROM scan headers, wherein a valid ROM scan header causes a Power On Self Test (POST) to turn ROM boot control over to an initialization routine for loading the add-in boot ROMs into the ROM scan area, wherein POST then compares contents of interrupt vectors to a state prior to calling the add-in boot ROM initialization program, and wherein any changes in interrupt vectors are saved in the SMI handler to identify a specific boot device and its associated ROM image when booting actually commences.

9. The system of claim 7, wherein the instructions are farther configured for:
initializing add-in device adapters that are coupled to a computer by:
recognizing all previously installed add-in device adapters that are coupled to a computer,
saving current interrupt vector table values in order to determine if a new add-in device adapter contains code for hooking a System Memory Interrupt (SMI), and
in response to determining that the ROM scan area does not have enough room to store the add-in boot ROMs of all of the add-in devices that are coupled to the computer, replacing each changed interrupt vector with a new ROM paging handler vector.

10. The system of claim 7, wherein the peripheral devices are Peripheral Component Interconnect (PCI) devices.

11. The system of claim 7, wherein the address space of the ROM scan area is between the computer's system memory addresses C0000h and DFFFFh.

12. The system of claim 11, wherein the upper memory has an address that is above DFFFFh in the computer's system memory.

13. A tangible computer-readable medium embodying computer program code, the computer program code comprising computer executable instructions configured for:
inserting an Over Commit Read Only Memory (ROM) scan header into a boot ROM in an add-in device adapter, wherein the Over Commit ROM scan header identifies the boot ROM of the add-in device adapter as being capable of supporting a process of paging out, from a ROM scan area, a previously stored boot ROM for an earlier peripheral device with a new boot ROM for a new peripheral device, and wherein each add-in device adapter provides an interface logic for a peripheral device;

loading and executing add-in boot ROMs for peripheral devices that are coupled to the computer by add-in device adapters until the ROM scan area is recognized by the computer as being full;

setting an overcommit flag to indicate to a Power On Self Test (POST) that an Over Commit module of a System Memory Interrupt (SMI) handler needs to be loaded into a System Management Memory (SMM) and linked to the SMI handler, wherein the overcommit flag signals a ROM scan process to determine which interrupt vectors each add-in boot ROM uses, and wherein a set overcommit flag enables a building of a table for the SMI handler to be able to recognize which add-in boot ROM is to be loaded into the ROM scan area during boot time;

in response to the computer detecting an overcommit condition in which the ROM scan area is unable to load add-in boot ROMs for all of the multiple peripheral devices, determining a next available address for allocation in an upper portion of a system memory's address space; and paging ROM data in and out of the ROM scan area by:
calling the Over Commit module of the SMI handler, invoking a POST/BIOS (Power-On Self Test/Basic Input-Output System) paging handler to determine if an initialization code from the new boot ROM is stored in the ROM scan area,
in response to determining that the initialization code from the new boot ROM is not stored in the ROM scan area, paging out all contents of the ROM scan area region to the next available address available for allocation in the upper memory location of system memory, and
storing the new boot ROM in the ROM scan area.

14. The tangible computer-readable medium of claim 13, wherein the computer executable instructions are further configured for:
during a ROM scan process in which boot ROMs for the peripheral devices are booted into the ROM scan area, finding and initializing all valid ROM scan headers, wherein a valid ROM scan header causes a Power On Self Test (POST) to turn ROM boot control over to an initialization routine for loading the add-in boot ROMs into the ROM scan area, wherein POST then compares contents of interrupt vectors to a state prior to calling the add-in boot ROM initialization program, and wherein any changes in interrupt vectors are saved in the SMI handler to identify a specific boot device and its associated ROM image when booting actually commences.

15. The tangible computer-readable medium of claim 13, wherein the computer executable instructions are further configured for:
  initializing add-in device adapters that are coupled to a computer by:
    recognizing all previously installed add-in device adapters that are coupled to a computer,
    saving current interrupt vector table values in order to determine if a new add-in device adapter contains code for hooking a System Memory Interrupt (SMI, and
    in response to determining that the ROM scan area does not have enough room to store the add-in boot ROMs of all of the add-in devices that are coupled to the computer, replacing each changed interrupt vector with a new ROM paging handler vector.

16. The tangible computer-readable medium of claim 13, wherein the peripheral devices are Peripheral Component Interconnect (PCI) devices.

17. The tangible computer-readable medium of claim 13, wherein the address space of the ROM scan area is between the computer's system memory addresses C0000h and DFFFFh.

18. The tangible computer-readable medium of claim 17, wherein the upper memory has an address that is above DFFFFh in the computer's system memory.

* * * * *